United States Patent
Jhong

(10) Patent No.: US 12,079,977 B2
(45) Date of Patent: Sep. 3, 2024

(54) IMAGE ANALYSIS METHOD AND IMAGE ANALYSIS SYSTEM

(71) Applicant: FlowVIEW Tek, Taipei (TW)

(72) Inventor: You-Yuan Jhong, Taipei (TW)

(73) Assignee: FlowVIEW Tek, Taipei (TW)

( * ) Notice: Subject to any disclaimer, the term of this patent is extended or adjusted under 35 U.S.C. 154(b) by 542 days.

(21) Appl. No.: 17/520,727

(22) Filed: Nov. 8, 2021

(65) Prior Publication Data

US 2022/0148154 A1 May 12, 2022

Related U.S. Application Data

(60) Provisional application No. 63/113,173, filed on Nov. 12, 2020.

(30) Foreign Application Priority Data

Jul. 6, 2021 (TW) .................................. 110124775

(51) Int. Cl.
*G06T 7/60* (2017.01)
*G06T 7/00* (2017.01)

(52) U.S. Cl.
CPC .............. *G06T 7/0004* (2013.01); *G06T 7/60* (2013.01); *G06T 2207/10056* (2013.01); *G06T 2207/30148* (2013.01)

(58) Field of Classification Search
CPC ..................... G06T 7/0004; G06T 7/60; G06T 2207/10056; G06T 2207/30148; G06T 2207/10061; G01B 11/02
USPC .................................................. 382/100, 145
See application file for complete search history.

(56) References Cited

U.S. PATENT DOCUMENTS

| | | | |
|---|---|---|---|
| 9,278,471 | B2 | 3/2016 | Chandrasekaran et al. |
| 2011/0299720 | A1 | 12/2011 | Nolen et al. |
| 2017/0109896 | A1* | 4/2017 | Park ...................... G06T 7/0004 |

(Continued)

FOREIGN PATENT DOCUMENTS

| | | |
|---|---|---|
| CN | 101026114 | 8/2007 |
| CN | 106601642 | 4/2017 |
| CN | 107068102 | 8/2017 |

(Continued)

OTHER PUBLICATIONS

"Office Action of China Counterpart Application", issued on Mar. 29, 2024, p. 1-p. 10.

(Continued)

*Primary Examiner* — Sheela C Chawan

(74) *Attorney, Agent, or Firm* — JCIP GLOBAL INC.

(57) ABSTRACT

The image analysis method of the disclosure includes following steps: obtaining an image of a multi-layer structure provided by an electron microscope and displaying the image of the multi-layer structure through a display device, wherein the image of the multi-layer structure is a gray-scale image; setting a measurement line segment on the image of the multi-layer structure, wherein the measurement line segment extends along a first direction; detecting a gray-scale distribution within the measurement line segment corresponding to the image of the multi-layer structure along the measurement line segment; and analyzing the gray-scale distribution to determine a plurality of dark layer thicknesses and a plurality of light layer thicknesses according to a threshold range.

10 Claims, 7 Drawing Sheets

(56) References Cited

U.S. PATENT DOCUMENTS

2021/0295496 A1* 9/2021 Fatih ................. H01L 22/12

FOREIGN PATENT DOCUMENTS

| | | |
|---|---|---|
| CN | 108287165 | 7/2018 |
| CN | 108698411 | 10/2018 |
| CN | 107024541 | 12/2019 |
| JP | 2000304709 | 11/2000 |
| JP | 2001221625 | 8/2001 |
| JP | 2013195074 | 9/2013 |
| TW | 201133673 | 10/2011 |
| TW | 201723427 | 7/2017 |
| TW | 202030696 | 8/2020 |

OTHER PUBLICATIONS

Shinya Terauchi et al., "Evaluation of the Film Thickness of Single-layer and Multi-layer Film by High-Resolution Transmission Electron Microscope", National Institute of Advanced Industrial Science and Technology (AIST), Nov. 6, 2006, pp. 87.

"Office Action of Japan Counterpart Application", with English translation thereof, issued on Sep. 30, 2022, p. 1-p. 6.

"Office Action of Taiwan Counterpart Application", issued on Nov. 15, 2022, p. 1-10.

* cited by examiner

IMAGE ANALYSIS METHOD AND IMAGE ANALYSIS SYSTEM

CROSS-REFERENCE TO RELATED APPLICATION

This application claims the priority benefit of U.S. application Ser. No. 63/113,173, filed on Nov. 12, 2020, and Taiwan application Ser. No. 110124775, filed on Jul. 6, 2021. The entirety of each of the above-mentioned patent applications is hereby incorporated by reference herein and made a part of this specification.

BACKGROUND

Technical Field

The disclosure relates to an analysis method, and in particular, to an image analysis method and an image analysis system.

Description of Related Art

In a semiconductor manufacturing process, the size of a device may affect the electrical change. Therefore, it is necessary for the size of a device to be accurate. An electron microscope with a magnifying function, such as a scanning electron microscope (SEM) or a transmission electron microscope (TEM), is usually used in the measurement of a semiconductor device. However, when using an electron microscope to measure the size of a device image, the size of each region is obtained by manually setting an edge point of each region one by one, which takes more time. Accordingly, some embodiments below are proposed as solutions to the issue above.

SUMMARY

The disclosure is directed to an image analysis method and an image analysis system which may automatically measure a thickness of each layer of an image of a multi-layer structure according to a set measurement line segment.

The image analysis method of the disclosure includes the following. An image of a multi-layer structure provided by an electron microscope is obtained. The image of the multi-layer structure is displayed through a display device, and the image of the multi-layer structure is a gray-scale image. A measurement line segment is set on the image of the multi-layer structure, and the measurement line segment extends along a first direction. A gray-scale distribution within the measurement line segment corresponding to the image of the multi-layer structure is detected along the measurement line segment. The gray-scale distribution is analyzed to determine multiple dark layer thicknesses and multiple light layer thicknesses in the image of the multi-layer structure according to a threshold range.

The image analysis system of the disclosure includes an electron microscope, a display device, and an image analysis device. The electron microscope is configured to provide an image of a multi-layer structure. The display device is configured to display the image of the multi-layer structure. The image analysis device is coupled to the electron microscope and the display device to obtain the image of the multi-layer structure provided by the electron microscope and output the image of the multi-layer structure to the display device. The image analysis device includes a storage device and a processor. The storage device includes an image analysis module. The processor is coupled to the storage device. The processor inputs the image of the multi-layer structure into the image analysis module. The processor sets a measurement line segment on the image of the multi-layer structure, and the measurement line segment extends along a first direction. The processor detects a gray-scale distribution within the measurement line segment corresponding to the image of the multi-layer structure along the measurement line segment through the image analysis module. The processor analyzes the gray-scale distribution through the image analysis module to determine multiple dark layer thicknesses and multiple light layer thicknesses in the image of the multi-layer structure according to a threshold range.

Based on the above, the image analysis method and the image analysis system of the disclosure may automatically measure the thickness of each layer of the image of the multi-layer structure according to the set measurement line segment. Therefore, a great amount of time spent on manual operation is reduced.

In order to make the aforementioned features and advantages of the disclosure comprehensible, embodiments accompanied with drawings are described in detail below.

DESCRIPTION OF THE EMBODIMENTS

Figure 1:
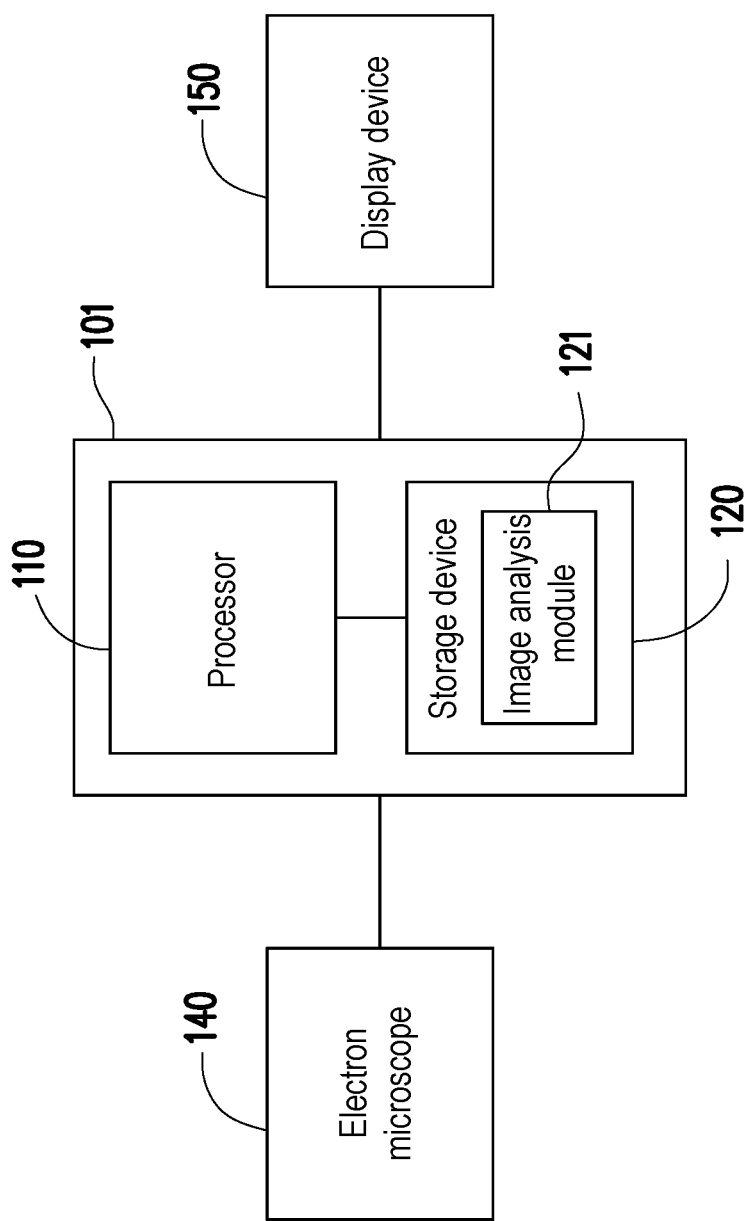
FIG. 1 is a schematic diagram of an image analysis system according to an embodiment of the disclosure.

In order to make the contents of the disclosure easier to understand, the following embodiments are specifically described as examples based on which the disclosure may be implemented. Wherever possible, the elements/components/steps with the same reference numerals in the drawings and embodiments represent the same or similar parts.

In addition, unless otherwise defined, all terms (including technical and scientific terms) used herein have the same meaning as commonly understood by those of ordinary skill in the art to which the disclosure belongs. It will be further understood that terms such as those defined in commonly used dictionaries shall be construed to have a meaning consistent with their meaning in the context of of the relevant art and the disclosure and will not be construed to have an idealized or overly formal meaning unless expressly defined as such herein.

FIG. 1 is a schematic diagram of an image analysis system according to an embodiment of the disclosure. Referring to FIG. 1, an image analysis system 100 may include an image analysis device 101, an electron microscope 140, and a display device 150. The electron microscope 140 may be configured to provide an image of a multi-layer structure by photographing an object of a semiconductor manufacturing process (a semiconductor product). The image of the multi-layer structure is an electron microscope image and a gray-scale image. The image of the multi-layer structure may include a multi-layer semiconductor structure layer of different materials, and a gray-scale distribution of an image of the multi-layer semiconductor structure layer may be determined according to different semiconductor materials.

In the embodiment, the display device 150 may be configured to display the image of the multi-layer structure. The image analysis device 101 may be coupled to the electron microscope 140 and the display device 150 to obtain the image of the multi-layer structure provided by the electron microscope 140 and output the image of the multi-layer structure to the display device 150. The image analysis device 101 may include a processor 110 and a storage device 120. The storage device 120 may include an image analysis module 121. The processor 110 may be coupled to the storage device 120. In the embodiment, the image analysis device 101 may be an independent computer device or cloud server. The disclosure is not limited thereto.

In the embodiment, the processor 110 may input the image of the multi-layer structure into the image analysis module 121, and the processor 110 may set a measurement line segment on the image of the multi-layer structure. The measurement line segment extends along a direction in which the multi-layer structure is stacked. In the embodiment, a method of the processor 110 setting the measurement line segment may include manual setting or automatic setting. Here, manual setting may be, for example but not limited to, setting a position of the measurement line segment through a setting instruction or parameter (e.g. input by a user) provided by an input device of the image analysis system 100. Automatic setting may be, for example but not limited to, automatic setting according to a margin range of an image or automatic setting according to a predetermined condition by the image analysis system 100.

Next, the processor 110 may detect a gray-scale distribution within the measurement line segment corresponding to the image of the multi-layer structure along the measurement line segment through the image analysis module 121. Furthermore, the processor 110 may analyze the gray-scale distribution through the image analysis module 121 to determine multiple dark layer thicknesses and multiple light layer thicknesses in the image of the multi-layer structure according to a threshold range. In this way, the image analysis system 100 may automatically measure the thickness of each layer of the image of the multi-layer structure according to the set measurement line segment. Therefore, a great amount of time spent on manual operation is reduced.

In the embodiment, the processor 110 may be, for example but not limited to, a central processing unit (CPU), a microprocessor control unit (MCU), or a field programmable gate array (FPGA).

In the embodiment, the storage device 120 may be, for example but not limited to, a random access memory (RAM), a read-only memory (ROM), an optical disc, a magnetic disk, a hard drive, a solid-state drive, a flash drive, a security digital (SD) card, a memory stick, a compact flash (CF) card, or any types of storage devices. The storage device 120 may store the image analysis module 121 and the related image data, the related analysis result and data, the display interface, and the like described in each embodiment for the processor 110 to access and execute.

In the embodiment, the electron microscope 140 may be, for example but not limited to, a scanning electron microscope (SEM) or a transmission electron microscope (TEM). In the embodiment, the display device 150 may be, for example, various electronic devices having a display function. In addition, in another embodiment, the display device 150 may be disposed in the image analysis device 101 so that the image analysis device 101 may be, for example, a computer device having a display function.

Figure 2:
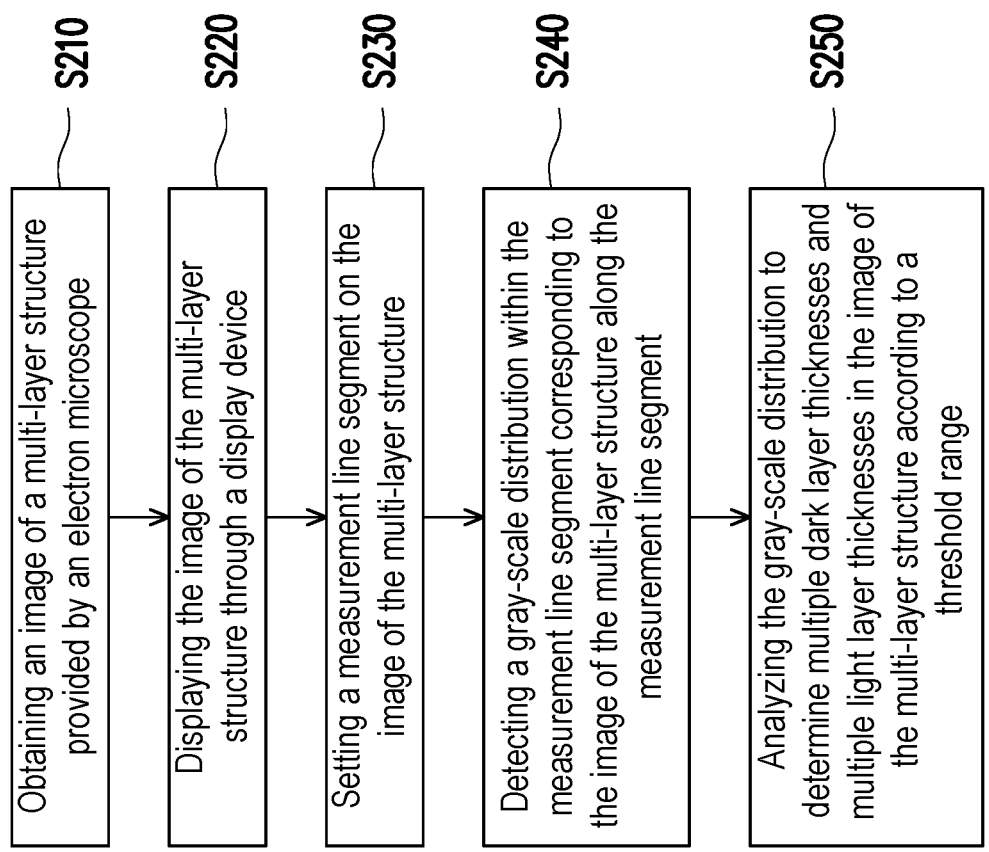
FIG. 2 is a flow chart of an image analysis method according to an embodiment of the disclosure.
Figure 3:
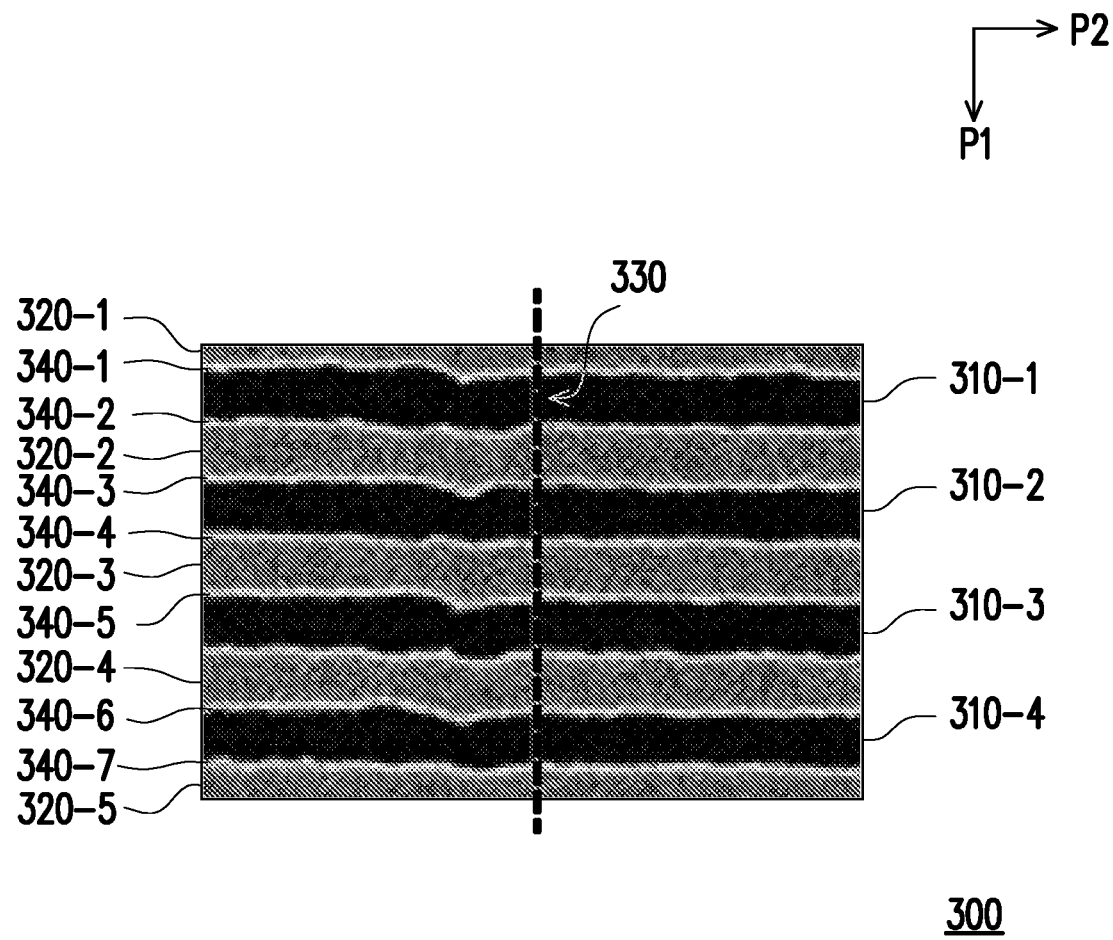
FIG. 3 is a schematic diagram of an image of a multi-layer structure according to an embodiment of the disclosure.
Figure 4:
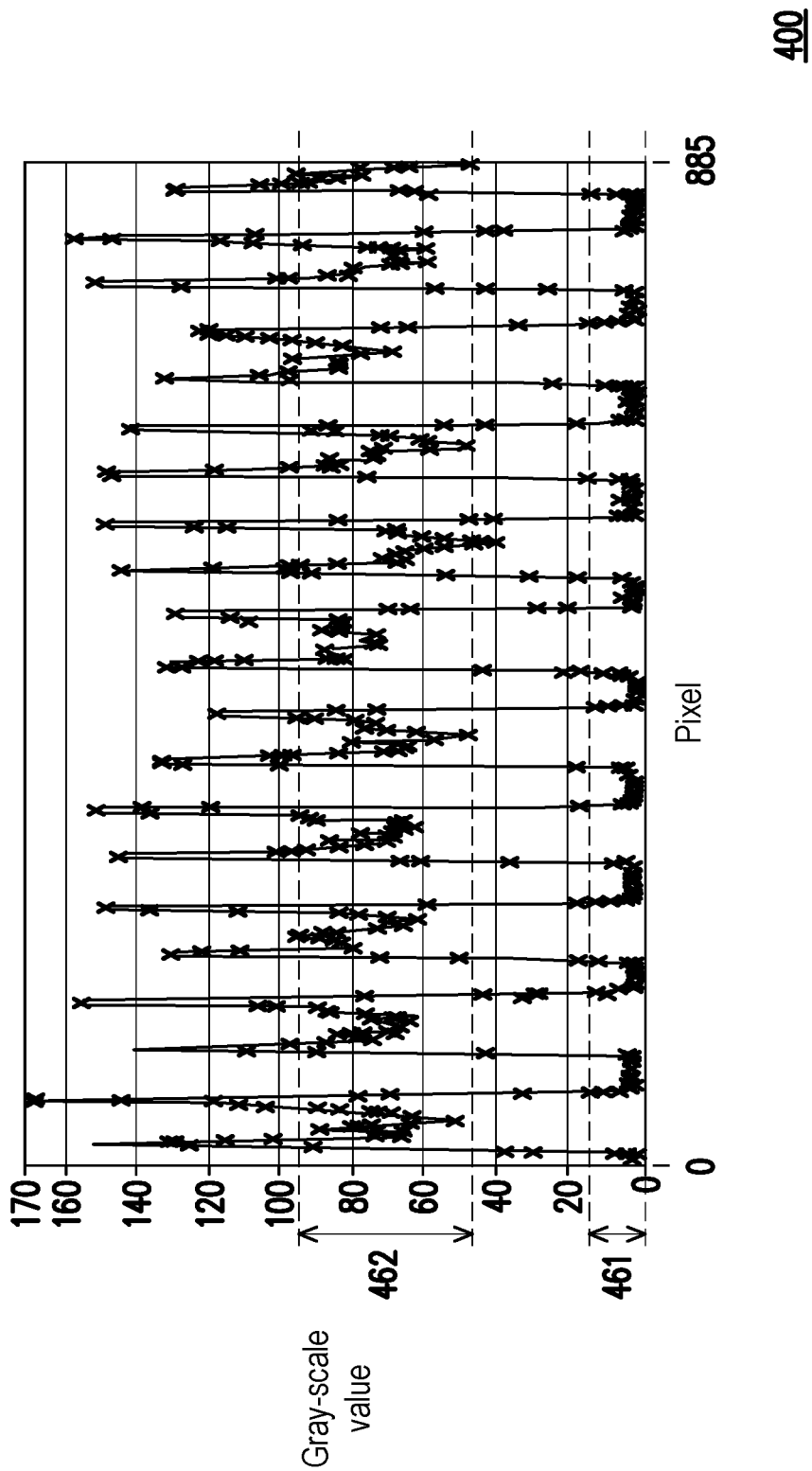
FIG. 4 is a schematic diagram of a gray-scale distribution according to an embodiment of the disclosure.

FIG. 2 is a flow chart of an image analysis method according to an embodiment of the disclosure. FIG. 3 is a schematic diagram of an image of a multi-layer structure according to an embodiment of the disclosure. FIG. 4 is a schematic diagram of a gray-scale distribution according to an embodiment of the disclosure. Referring to FIG. 1 to FIG. 4, in the embodiment, the image analysis system 100 may execute the following steps S210 to S250 of an image analysis method. In step S210, the image analysis device 101 may obtain an image 300 of a multi-layer structure provided by the electron microscope 140. In step S220, the image analysis device 101 may display the image 300 of the multi-layer structure through the display device 150. In step S230, the image analysis module 121 may set a measurement line segment 330 on the image 300 of the multi-layer structure. In step S240, the image analysis module 121 detects a gray-scale distribution 400 within the measurement line segment 330 corresponding to the image 300 of the multi-layer structure along the measurement line segment 330. In step S250, the image analysis module 121 analyzes the gray-scale distribution 400 to determine multiple dark layer thicknesses and multiple light layer thicknesses in the image 300 of the multi-layer structure according to a threshold range 461 and a threshold range 462.

Specifically, the image 300 of the multi-layer structure may be a gray-scale image, and a first direction P1 is perpendicular to a second direction P2. Furthermore, the image 300 of the multi-layer structure may include multiple dark layer images 310-1 to 310-4 and multiple light layer images 320-1 to 320-5. The dark layer images 310-1 to 310-4 and the light layer images 320-1 to 320-5 are arranged in an interlacing manner along the first direction P1, and the dark layer images 310-1 to 310-4 and the light layer images 320-1 to 320-5 respectively extend along the second direction P2. In the embodiment, the dark layer images 310-1 to 310-4 may be a first type semiconductor material layer, and the light layer images 320-1 to 320-5 may be a second type semiconductor material layer. The first type semiconductor material layer is different from the second type semiconductor material layer. In the embodiment, multiple white thin layer images 340-1 to 340-7 may be further present respectively between the dark layer images 310-1 to 310-4 and the light layer images 320-1 to 310-5, and the white thin layer images 340-1 to 340-7 may be a third type semiconductor material layer which is different from the first type and the second type.

Referring to FIG. 1 to FIG. 4, in step S230, the processor 110 may execute the image analysis module 121 to set the measurement line segment 330 on the image 300 of the multi-layer structure (through manual setting or automatic setting as described above). In step S240, the processor 110 may detect multiple consecutive pixels within the measurement line segment 330 corresponding to the image 300 of the multi-layer structure along the measurement line segment 330 to obtain multiple gray-scale values of the pixels. In addition, the processor 110 may establish the gray-scale distribution 400 as shown in FIG. 4 according to the gray-scale values. In step S250, the processor 110 may analyze the gray-scale distribution 400 and determine the dark layer thicknesses and the light layer thicknesses in the image 300 of the multi-layer structure according to the predetermined threshold range 461 and the predetermined threshold range 462. Here, as shown in FIG. 4, a value on the horizontal axis of the gray-scale distribution 400 may correspond to each of the pixels on the measurement line segment 330 along the first direction P1, and a value on the vertical axis may represent a gray-scale value of each of the pixels within the measurement line segment 330 corresponding to the image 300 of the multi-layer structure.

In the embodiment, the threshold range 461 (also referred to as a first threshold range) may be set as, for example but not limited to, 0 to 15, and the threshold range 462 (also referred to as a second threshold range) may be set as, for example but not limited to, 45 to 90. That is, when a gray-scale value of a pixel is between 0 and 15, the pixel may be considered to be a dark pixel. Conversely, when a gray-scale value of another pixel is between 45 and 90, the pixel may be considered to be a light pixel. For example, in step S250, the processor 110 may determine a pixel whose gray-scale value is in the threshold range 461 as the dark pixel. Further, the processor 110 may determine a pixel whose gray-scale value is in the threshold range 462 as the light pixel. Next, the processor 110 may calculate the number of dark pixels corresponding to each of the dark layer thicknesses or the number of light pixels corresponding to each of the light layer thicknesses on the measurement line segment 330 by determination of the starting point and the end point of each layer according to a slope value of two consecutive gray-scale values to respectively obtain each of the dark layer thicknesses or each of the light layer thicknesses. That is, each of the dark layer thicknesses corresponds to the number of the dark pixels of each of the dark layer thicknesses, and each of the light layer thicknesses corresponds to the number of the light pixels of each of the light layer thicknesses.

In the embodiment, when the processor 110 finishes calculating the number of the dark pixels of each of the dark layers and the number of the light pixels of each of the light layers, the processor 110 may instantly convert such numbers into corresponding thickness parameters to output a measurement result. For example, a pixel may correspond to 1 nanometer. In an embodiment, assuming that the sixth pixel to the forty-fourth pixels are the light pixels, the processor 110 may obtain that a thickness of a layer of a corresponding light layer image is 39 nanometers (44-6+1=39). However, a correspondence relationship between a pixel and a length may be adjusted through manual setting or automatic detection. The disclosure is not limited thereto.

In addition, in the embodiment, the overall measurement result may be presented as Table 1 below and displayed on the display device 150. The disclosure is not limited thereto. In the embodiment, layer numbers may represent numbers of the dark layer images 310-1 to 310-4 or the light layer images 320-1 to 320-5 which sequentially intersect with the measurement line segment 330 along the first direction P1 in the image 300 of the multi-layer structure. In the embodiment, an average gray-scale value may represent an average value of the gray-scale values of the pixels corresponding to the dark layer images 310-1 to 310-4 or the light layer images 320-1 to 320-5 which sequentially intersect with the measurement line segment 330 along the first direction P1 in the image 300 of the multi-layer structure. In the embodiment, a measurement thickness may represent a dark layer thickness or a light layer thickness corresponding to the layer number.

TABLE 1

| Layer number | Average gray-scale value | Measurement thickness |
| --- | --- | --- |
| 1 | 8 | 38 |
| 2 | 80 | 39 |
| 3 | 5 | 38 |
| 4 | 83 | 35 |

In addition, in an embodiment, the image 300 of the multi-layer structure may include the dark layer images 310-1 to 310-4 and the light layer images 320-1 to 320-5 with multiple different gray-scale value ranges. The processor 110 may correspondingly set the threshold range 461, the threshold range 462, or other threshold ranges to measure the thicknesses. Furthermore, in an embodiment, in the image 300 of the multi-layer structure, the dark layer images 300-1 to 310-4 and the light layer images 320-1 to 320-5 with the different gray-scale value ranges may be arranged randomly along the first direction P1, but not limited to the dark layer images 310-1 to 310-4 and the light layer images 320-1 to 320-5 being arranged in an interlacing manner along the first direction P1.

Figure 5:
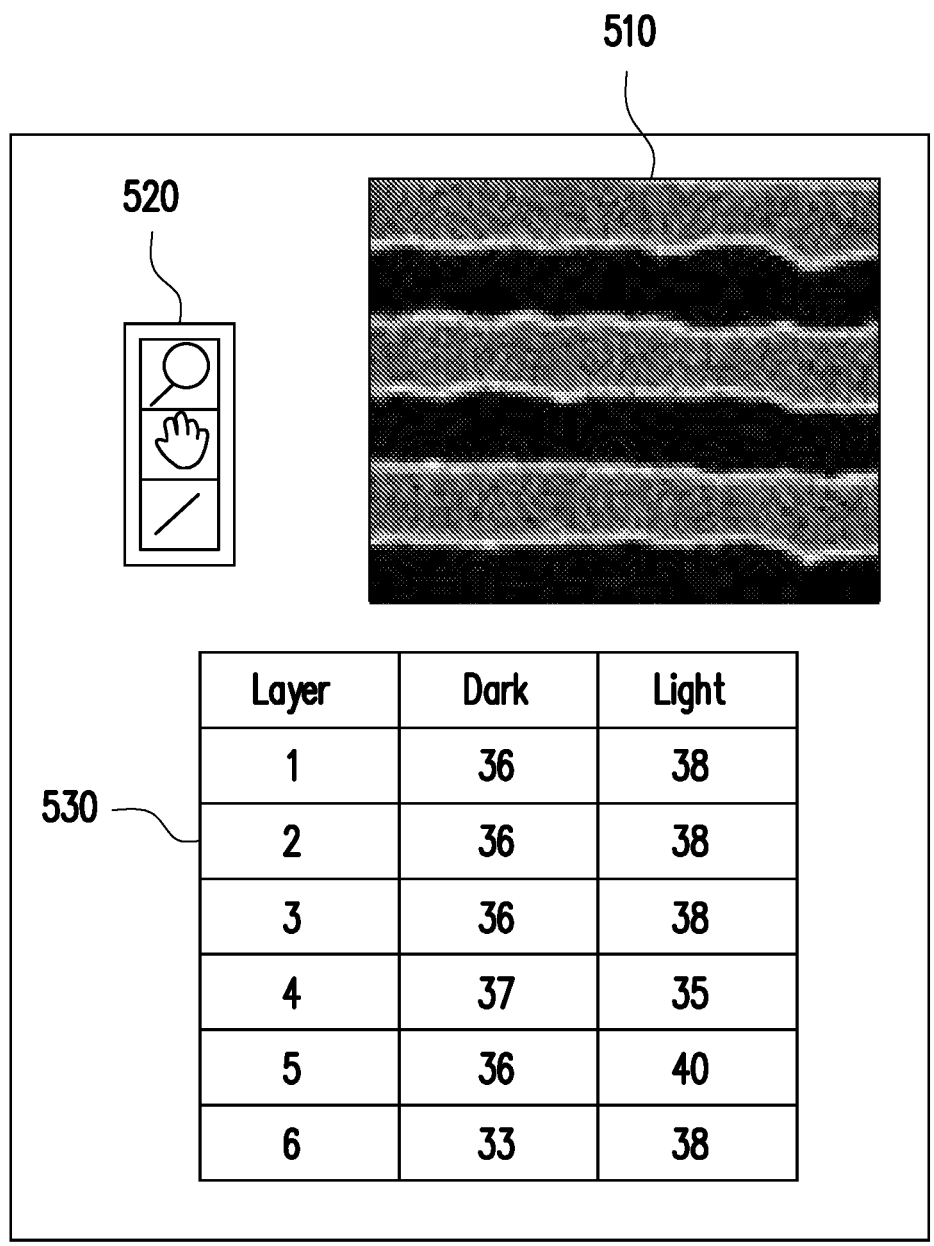
FIG. 5 is a schematic diagram of a display interface according to an embodiment of the disclosure.

FIG. 5 is a schematic diagram of a display interface according to an embodiment of the disclosure. Referring to FIG. 3 and FIG. 5, a display interface 500 may include an image 510 of a multi-layer structure, a tool bar 520, and a measurement result 530. With regard to the description of the image 510 of the multi-layer structure, the description of the image 300 of the multi-layer structure in FIG. 3 may be referred to, and it will not be repeated here. In the embodiment, the tool bar 520 may include buttons of a magnifier, moving a display range, setting a measurement line segment, and the like to be configured for a user to operate; however, the disclosure is not limited thereto. For example, the user may use the button of setting a measurement line segment on the tool bar 520 to set the desired measurement line segment 330 on his own. Furthermore, the measurement result 530 may include, for example, the layer number and the dark layer thickness corresponding to the dark layer (Dark) or the light layer thickness corresponding to the light layer. Note that, in the measurement result 530, the dark layer thickness and the light layer thickness respectively correspond to a same layer number. In another embodiment, the measurement result 530 may be in a form like Table 1, and the layer number only corresponds to one dark layer thickness or one light layer thickness. In the embodiment, the display interface 500 may be displayed on the display device 150 for the user to instantly view the measurement result 530.

Figure 6:
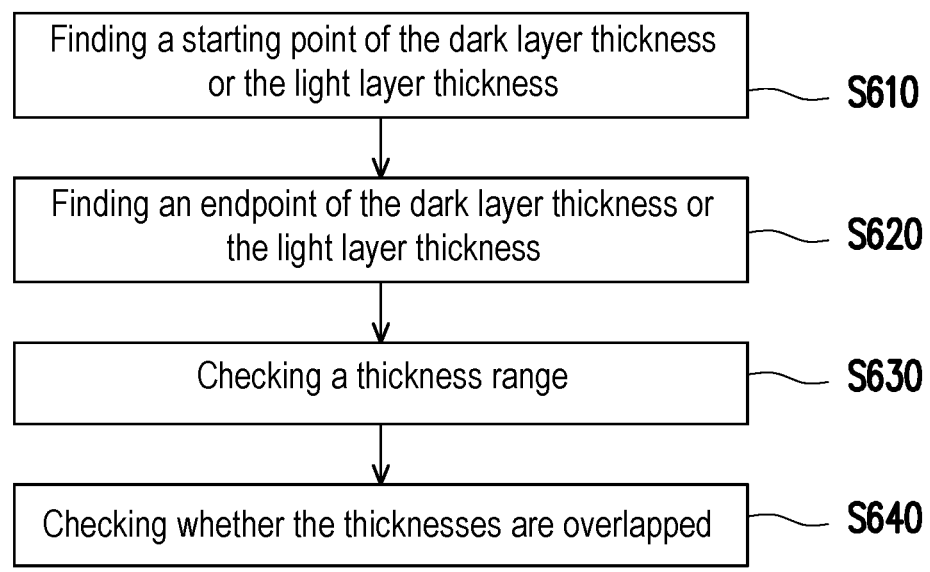
FIG. 6 is a flow chart of an image analysis method according to an embodiment of the disclosure.

FIG. 6 is a flow chart of an image analysis method according to an embodiment of the disclosure. Referring to FIG. 1 to FIG. 4 and FIG. 6, step S250 in FIG. 2 may be realized, for example, by adopting the method in FIG. 6. In the embodiment, when the processor 110 executes the image analysis module 121 to analyze the gray-scale distribution 400, the process may be divided into the four steps below: step S610 (finding a starting point of the dark layer thickness or the light layer thickness), step S620 (finding an endpoint of the dark layer thickness or the light layer thickness), step S630 (checking a thickness range), and step S640 (checking whether the thicknesses are overlapped).

Note that since gray-scale values of the white thin layer images 340-1 to 340-7 are greater than the gray-scale values of the dark layer images 310-1 to 310-4 and the light layer images 320-1 to 320-5, when the processor 110 analyzes the gray-scale distribution 400, the gray-scale values decrease gradually in both cases of entering from the white thin layer images 340-1 to 340-7 to the dark layer images 310-1 to 310-4 or entering from the white thin layer images 340-1 to 340-7 to the light layer images 320-1 to 320-5. That is, a slope value of two consecutive gray-scale values is negative. Next, as long as the processor 110 determines that an interval formed by two consecutive gray-scale values includes upper limit values of the threshold range 461 and the threshold range 462 and whether the second gray-scale value of the two consecutive gray-scale values belongs to the threshold range 461 of the dark layer images 310-1 to 310-4 or the threshold range 462 of the light layer images 320-1 to 320-5, the processor 110 may mark the starting point of the dark layer thickness or the light layer thickness. That is, when the processor 110 determines that an interval formed by two consecutive gray-scale values includes the upper limit value of the threshold range 461 (also referred to as a first upper limit value) and that the second pixel of the corresponding two consecutive pixels is the dark pixel, the processor 110 marks the second pixel of the corresponding two consecutive pixels as the dark layer starting point of the corresponding dark layer thickness. Similarly, when the processor 110 determines that an interval formed by two consecutive gray-scale values includes the upper limit value of the threshold range 462 (also referred to as a second upper limit value) and that the second pixel of the corresponding two consecutive pixels is the light pixel, the processor 110 marks the second pixel of the corresponding two consecutive pixels as the light layer starting point of the corresponding light layer thickness.

In addition, when the processor 110 analyzes the gray-scale distribution 400, the gray-scale values increase gradually in both cases of entering from the dark layer images 310-1 to 310-4 into the white thin layer images 340-1 to 340-7 or entering from the light layer images 320-1 to 320-5 to the white thin layer images 340-1 to 340-7. That is, a slope value of two consecutive gray-scale values is positive. Next, as long as the processor 110 determines that an interval formed by two consecutive gray-scale values includes the upper limit values of the threshold range 461 and the threshold range 462 and whether the second gray-scale value of the two consecutive gray-scale values does not belong to the threshold range 461 of the dark layer images 310-1 to 310-4 or the threshold range 462 of the light layer images 320-1 to 320-5, the processor 110 may mark the endpoint of the dark layer thickness or the light layer thickness. That is, when the processor 110 determines that an interval formed by two consecutive gray-scale values includes the first upper limit value of the threshold range 461 and that the first pixel of the corresponding two consecutive pixels is the dark pixel, the processor 110 marks the first pixel of the corresponding two consecutive pixels as the dark layer endpoint of the corresponding dark layer thickness. Similarly, when the processor 110 determines that an interval formed by two consecutive gray-scale values includes the second upper limit value of the threshold range 462 and that the first pixel of the corresponding two consecutive pixels is the light pixel, the processor 110 marks the first pixel of the corresponding two consecutive pixels as the light layer endpoint of the corresponding light layer thickness.

In the embodiment, the processor 110 may set a decreasing threshold value and determine whether the slope value is less than the decreasing threshold value to mark the starting point of the dark layer thickness or the light layer thickness. In the embodiment, the processor 110 may set an increasing threshold value and determine whether the slope value is greater than the increasing threshold value to mark the endpoint of the dark layer thickness or the light layer thickness. For example, both of the decreasing threshold value and the increasing threshold value may be set as 0; however, the disclosure is not limited thereto. That is, the processor 110 may determine whether the slope value is negative (less than 0) to mark the starting point of the dark layer thickness or the light layer thickness. Furthermore, the processor 110 may determine whether the slope value is positive (greater than 0) to mark the endpoint of the dark layer thickness or the light layer thickness. In an embodiment, the decreasing threshold value and the increasing threshold value may be respectively set as the same value or different values according to a need of design, and the disclosure is not limited thereto.

For example, in step S610, when the processor 110 analyzes the gray-scale distribution 400, the processor 110 may calculate the slope value of two consecutive gray-scale values. The processor 110 may mark the pixel corresponding to the second gray-scale value of the two consecutive gray-scale values as the starting point of the dark layer or the light layer according to a change of the slope value and by determining whether the second gray-scale value of the two consecutive gray-scale values falls into the threshold range 461 corresponding to the dark layer images 310-1 to 310-4 or the threshold range 462 corresponding to the light layer images 320-1 to 320-5. That is, the processor 110 determines whether the interval formed by the two consecutive gray-scale values includes the upper limit values of the threshold range 461 and the threshold value 462 to mark the pixel corresponding to the second gray-scale value of the two consecutive gray-scale values as the starting point of the dark layer or the light layer.

In step S620, when the processor 110 analyzes the gray-scale distribution, the processor 110 may calculate the slope value of two consecutive gray-scale values. The processor 110 may mark the pixel corresponding to the first gray-scale value of the two consecutive gray-scale values as the endpoint of the dark layer or the light layer according to the change of the slope value and by determining whether the second gray-scale value of the two consecutive gray-scale values leaves the threshold range 461 corresponding to the dark layer images 310-1 to 310-4 or the threshold range 462 corresponding to the light layer images 320-1 to 320-5. That is, the processor 110 determines whether the interval formed by the two consecutive gray-scale values includes the upper limit values of the threshold range 461 and the threshold value 462 to mark the pixel corresponding to the first gray-scale value of the two consecutive gray-scale values as the endpoint of the dark layer or the light layer.

Next, in step S630, the processor 110 respectively calculates the number of the pixels between the starting point and the endpoint corresponding to each of the dark layer thicknesses or light layer thicknesses. In this way, the processor 110 may calculate the corresponding dark layer thicknesses or light layer thicknesses according to the number of the pixels between the starting point and the endpoint corresponding to each of the dark layer thicknesses or light layer thicknesses.

Furthermore, the processor 110 may check the pixels to leave out an incorrect starting point. For example, the processor 110 may check whether the average gray-scale values of all the pixels between the starting point and the endpoint of each of the dark layer thicknesses fall into the threshold range 461 corresponding to the dark layer images 310-1 to 310-4 or whether the average gray-scale values of all the pixels between the starting point and the endpoint of each of the light layer thicknesses fall into the threshold range 462 corresponding to the light layer images 320-1 to 320-5. When the checking result is correct, the processor 110 may calculate the number of the pixels between the starting point and the endpoint corresponding to each of the dark layer thicknesses or light layer thicknesses. Conversely, when the checking result is incorrect, the processor 110 may leave out a current starting point and start over to continue determining a next starting point as a new starting point.

Last, in step S640, the processor 110 may check whether the adjacent dark layer thickness or the adjacent light layer thickness corresponds to the same pixel to check whether the thicknesses are overlapped. Overlapped thicknesses are considered to be the same dark layer thickness or light layer thickness. That is, when the processor 110 checks that the adjacent dark layer thickness or the adjacent light layer thickness corresponds to the same pixel, the processor 110 may combine the adjacent light layer thickness or the adjacent dark layer thickness into a single light layer thickness or dark layer thickness. In this way, the processor 110 may correct an overlap of the dark layer thickness or the light layer thickness caused by an interference of noise so as to obtain a correct dark layer thickness or light layer thickness. In addition, in an embodiment, step S640 may be omitted, and the thickness calculated and obtained in step S630 may be directly taken as the dark layer thickness or the light layer thickness.

Figure 7:
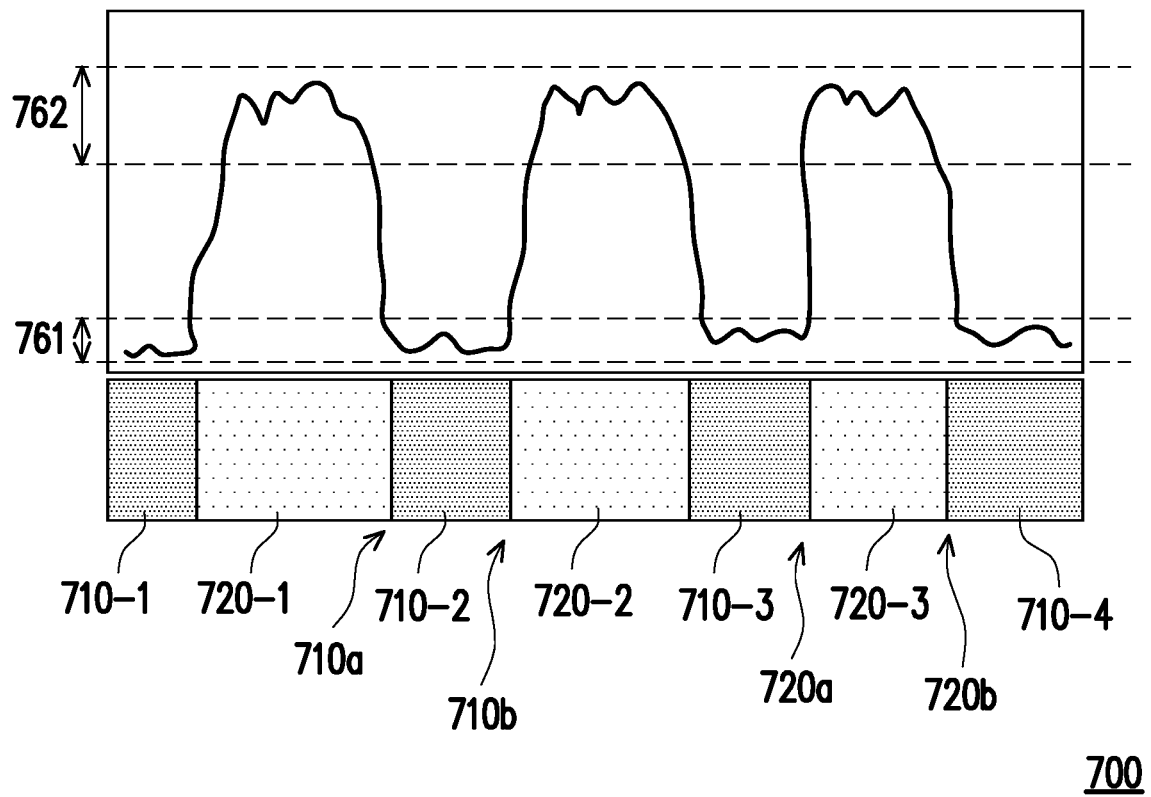
FIG. 7 is a schematic diagram of a gray-scale distribution of an image of a multi-layer structure according to an embodiment of the disclosure.

FIG. 7 is a schematic diagram of a gray-scale distribution of an image of a multi-layer structure according to an embodiment of the disclosure. Referring to FIG. 1 and FIG. 7, in the embodiment, a gray-scale distribution 700 of an image of a multi-layer structure may only include multiple dark layer images 710-1 to 710-4 and multiple light layer images 720-1 to 720-3 and may omit the white thin layer images 340-1 to 340-7 as shown in FIG. 3. Similar to the method described above, the processor 110 may respectively determine whether two consecutive gray-scale values belong to a threshold range 761 of the dark layer images 710-1 to 710-4 and a threshold range 762 of the light layer images 720-1 to 720-3 when determining the starting point or the endpoint of the dark layer thickness or the light layer thickness. In other words, the processor 110 may determine whether an interval formed by two consecutive gray-scale values includes an upper limit value of the threshold range 761 to mark the starting point or the endpoint of the dark layer thickness. In addition, the processor 110 may determine whether an interval formed by two consecutive gray-scale values includes an upper limit value of the threshold range 762 to mark the starting point or the endpoint of the light layer thickness. Next, the processor 110 may determine whether the starting point or the endpoint belongs to the dark layer thickness or the light layer thickness according to whether the second pixel of the two consecutive gray-scale values enters or leaves the threshold range 761 of the dark layer images 710-1 to 710-4 or the threshold range 762 of the light layer images 720-1 to 720-3. In addition, the method for thickness calculation in detail is as described above, and it will not be repeated here.

Furthermore, the processor 110 may determine the starting point or the endpoint of the dark layer thickness or the light layer thickness according to the slope value being positive or negative; however, the disclosure is not limited thereto. Specifically, when entering from the dark layer into the light layer, the gray-scale value may increase gradually. When entering from the light layer into the dark layer, the gray-scale value may decrease gradually. That is, the processor 110 may determine whether the second pixel of the two consecutive pixels is the dark pixel or the light pixel according to the slope value of the two consecutive gray-scale values. For example, the processor 110 may determine a starting point 710a of the dark layer thickness according to the slope value being negative, and the processor 110 may determine an endpoint 710b of the dark layer thickness according to the slope value being positive. Furthermore, the processor 110 may determine a starting point 720a of the light layer thickness according to the slope value being positive, and the processor 110 may determine an endpoint 720b of the light layer thickness according to the slope value being negative.

In summary of the above, the image analysis method and the image analysis system of the disclosure may automatically and rapidly measure the thickness of each layer of the image of the multi-layer structure according to the set measurement line segment. Therefore, a great amount of time spent on manually measuring the thickness of each layer is reduced. Furthermore, the image analysis method and the image analysis system of the disclosure may effectively avoid the interference of image noise or the influence of material impurities and accurately measure the thickness of each layer of the image of the multi-layer structure.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image analysis method, comprising:
    obtaining an image of a multi-layer structure provided by an electron microscope, displaying the image of the multi-layer structure through a display device, wherein the image of the multi-layer structure is a gray-scale image;
    setting a measurement line segment on the image of the multi-layer structure, wherein the measurement line segment extends along a first direction;
    detecting a gray-scale distribution within the measurement line segment corresponding to the image of the multi-layer structure along the measurement line segment, wherein the gray-scale distribution comprises a distribution of a plurality of gray-scale values of a plurality of pixels within the measurement line segment corresponding to the image of the multi-layer structure; and
    analyzing the gray-scale distribution to determine a plurality of dark layer thicknesses and a plurality of light layer thicknesses in the image of the multi-layer structure according to a threshold range and an interval formed by two consecutive gray-scale values.

2. The image analysis method according to claim 1, wherein the image of the multi-layer structure comprises a plurality of dark layer images and a plurality of light layer images, the dark layer images and the light layer images are arranged in an interlacing manner along the first direction, and the dark layer images and the light layer images respectively extend along a second direction, wherein the first direction is perpendicular to the second direction.

3. The image analysis method according to claim 1, wherein analyzing the gray-scale distribution comprises
    comparing the gray-scale values of the pixels and the threshold range to determine a plurality of dark pixels corresponding to the dark layer thicknesses and a plurality of light pixels corresponding to the light layer thicknesses.

4. The image analysis method according to claim 3, wherein the threshold range comprises a first threshold range and a second threshold range, wherein analyzing the gray-scale distribution comprises:
- in response to determining that the gray-scale values belong to the first threshold range, determining that the pixels corresponding to the gray-scale values belong to the dark pixels; and
- in response to determining that the gray-scale values belong to the second threshold range, determining that the pixels corresponding to the gray-scale values belong to the light pixels.

5. The image analysis method according to claim 4, wherein the dark layer thicknesses correspond to a number of the dark pixels of the dark layer thicknesses, and the light layer thicknesses correspond to a number of the light pixels of the light layer thicknesses.

6. The image analysis method according to claim 4, wherein analyzing the gray-scale distribution comprises:
- determining that an interval formed by two consecutive gray-scale values among the gray-scale values comprises a first upper limit value of the first threshold range, and in response to determining that a second pixel of the two consecutive pixels is the dark pixel, marking the second pixel of the corresponding two consecutive pixels as a dark layer starting point of the corresponding dark layer thickness; and
- determining that an interval formed by two consecutive gray-scale values among the gray-scale values comprises a second upper limit value of the second threshold range, and in response to determining that a second pixel of the two consecutive pixels is the light pixel, marking the second pixel of the corresponding two consecutive pixels as a light layer starting point of the corresponding light layer thickness.

7. The image analysis method according to claim 6, wherein analyzing the gray-scale distribution comprises:
- determining that an interval formed by two consecutive gray-scale values among the gray-scale values comprises the first upper limit value of the first threshold range, and in response to determining that a first pixel of the two consecutive pixels is the dark pixel, marking the first pixel of the corresponding two consecutive pixels as a dark layer endpoint of the corresponding dark layer thickness; and
- determining that an interval formed by two consecutive gray-scale values among the gray-scale values comprises the second upper limit value of the second threshold range, and in response to determining that a first pixel of the two consecutive pixels is the light pixel, marking the first pixel of the corresponding two consecutive pixels as a light layer endpoint of the corresponding light layer thickness.

8. The image analysis method according to claim 7, wherein the dark layer thicknesses correspond to a number of the dark pixels between the dark layer starting point and the dark layer endpoint of the dark layer thicknesses, and the light layer thicknesses correspond to a number of the light pixels between the light layer starting point and the light layer endpoint of the light layer thicknesses.

9. The image analysis method according to claim 8, further comprising:
- after checking that the adjacent dark layer thickness or the adjacent light layer thickness corresponds to the same pixel, combining the adjacent light layer thickness or the adjacent dark layer thickness into the single light layer thickness or the single dark layer thickness.

10. An image analysis system, comprising:
an electron microscope configured to provide an image of a multi-layer structure;
a display device configured to display the image of the multi-layer structure; and
an image analysis device coupled to the electron microscope and the display device to obtain the image of the multi-layer structure provided by the electron microscope and output the image of the multi-layer structure to the display device, wherein the image analysis device comprises:
- a storage device comprising an image analysis module; and
- a processor coupled to the storage device, wherein
the processor inputs the image of the multi-layer structure into the image analysis module,
the processor sets a measurement line segment on the image of the multi-layer structure, wherein the measurement line segment extends along a first direction;
the processor detects a gray-scale distribution within the measurement line segment corresponding to the image of the multi-layer structure along the measurement line segment through the image analysis module, and
the processor analyzes the gray-scale distribution through the image analysis module to determine a plurality of dark layer thicknesses and a plurality of light layer thicknesses in the image of the multi-layer structure according to a threshold range.

* * * * *